(12) United States Patent
Wilkens (10) Patent No.: US 11,225,115 B2
(45) Date of Patent: Jan. 18, 2022

(54) AIR RIDE COUPLER FOR TRAILER TONGUE

(71) Applicant: Jeffrey Arnold Wilkens, West Fargo, ND (US)

(72) Inventor: Jeffrey Arnold Wilkens, West Fargo, ND (US)

(73) Assignee: Air Hitch Technologies, LLC, Fargo, ND (US)

( * ) Notice: Subject to any disclaimer, the term of this patent is extended or adjusted under 35 U.S.C. 154(b) by 420 days.

(21) Appl. No.: 16/403,239

(22) Filed: May 3, 2019

(65) Prior Publication Data

US 2020/0346504 A1 Nov. 5, 2020

(51) Int. Cl.
 *B60D 1/24* (2006.01)
 *B60D 1/52* (2006.01)
 *B60D 1/06* (2006.01)

(52) U.S. Cl.
 CPC ............. *B60D 1/249* (2013.01); *B60D 1/06* (2013.01); *B60D 1/52* (2013.01)

(58) Field of Classification Search
 CPC ............. B60D 1/06; B60D 1/52; B60D 1/249
 USPC ........................................................ 280/504
 See application file for complete search history.

(56) References Cited

U.S. PATENT DOCUMENTS

| | | | |
|---|---|---|---|
| 2,783,039 A | 2/1957 | Wilson | |
| 3,180,657 A | 4/1965 | Molter, Sr. | |
| 4,773,668 A | 9/1988 | Muonro | |
| 4,978,133 A | 12/1990 | Thorne et al. | |
| 5,887,884 A * | 3/1999 | Smith | B60D 1/322 280/489 |
| 6,834,879 B1 | 12/2004 | Lorman | |
| 7,044,493 B1 * | 5/2006 | Wilson | B60D 1/50 280/474 |
| 7,093,845 B1 * | 8/2006 | Fast | B60D 1/50 280/489 |
| 2004/0262883 A1 | 12/2004 | Kerins et al. | |
| 2008/0296867 A1 | 12/2008 | Bouwkamp et al. | |

FOREIGN PATENT DOCUMENTS

| | | | |
|---|---|---|---|
| AU | 2013221947 B2 | | 3/2014 |
| AU | 2013221947 B2 | * | 4/2017 |

* cited by examiner

*Primary Examiner* — Tony H Winner
*Assistant Examiner* — Felicia L. Brittman
(74) *Attorney, Agent, or Firm* — Russell Manning; FisherBroyles, LLP (57) ABSTRACT

The present invention is directed to an trailer coupling assembly for connection to a trailer tongue. The trailer coupling assembly includes an attachment bracket configured to attach to a trailer tongue. A trailer coupler, which is configured to attach to a tow ball, is pivotally connected to the attachment bracket. The pivotal connection allows movement between the trailer coupler and the tongue of the trailer. An absorber further connects to the attachment bracket and the pivotally connected trailer coupler. The absorber dampens movement between the trailer tongue (e.g., attachment bracket) and the trailer coupler.

12 Claims, 7 Drawing Sheets

AIR RIDE COUPLER FOR TRAILER TONGUE

FIELD OF THE INVENTION

The present disclosure relates generally to devices for attaching trailers to motor vehicles (i.e., tow vehicles). More particularly, the present disclosure relates to a trailer coupler assembly for a trailer that provides a cushioned coupling to provide shock absorption between a trailer and a tow vehicle during travel.

BACKGROUND

Vehicles, such as trucks, SUVs and cars (e.g., light tow vehicles) often tow trailers for a variety of uses such as towing campers, boats, snowmobiles and/or hauling cargo. Trailer hitches for light tow vehicles come in two main configurations: receiver type and fixed-drawbar type. Receiver-type hitches use removable ball mounts, whereas the fixed-drawbar-type hitches have integrated ball mounts (e.g., apertures). Receiver-type hitches consist of a portion that mounts to the frame of the vehicle that has a rearward-facing opening that accepts removable ball mounts, hitch bike racks, cargo carriers, or other hitch mounted accessories. The ball mount for a receiver-type hitch is typically a square bar that fits into a receiver attached to the vehicle. Removable ball mounts are offered with varying rise or drop to accommodate variations in the height of the vehicle and trailer to provide for level towing. Fixed-drawbar hitches are typically built as one piece, have an integrated aperture that receives a tow ball, and are generally not compatible with aftermarket hitch accessories. In any configuration, a tow ball, which may vary in size, attaches to the ball mount. A coupler attached to a tongue of a trailer engages the tow ball and typically includes a locking mechanism that secures the coupler to the tow ball while permitting rotational movement between the tow vehicle and the attached trailer.

While in motion, the tow vehicle and attached trailer tend to bounce to some degree. The extent of such bouncing depends on the tow vehicle's speed and road conditions. When a trailer is attached to a tow vehicle by a standard lock-down or solid connection hitch, the trailer cannot move independently of the vehicle. As a result, any bouncing and/or vibration of the trailer is transferred to the tow vehicle through the hitch. That is, movement of the trailer relative to the tow vehicle may result in the application of forces to the vehicle. The comfort and possibly safety of the driver and passengers may be compromised whenever the forces exerted by the relative movement of the trailer make it difficult to control the vehicle, for example, if the driver encounters high bumps, dips, railroad tracks, elevation changes, expansion joints, etc.

Several attempts to alleviate the problems associated with solid connection hitches have been proposed. For instance, a number of receiver hitches have been designed that include a frame that provides movement (e.g., pivotal movement) between the tow vehicle and the ball mount. Such arrangements allow for limited relative movement (e.g., vertical movement) between the vehicle and a trailer. However, such arrangements typically do not accommodate variations in the height of the vehicle and trailer to provide for level towing.

SUMMARY OF THE INVENTION

The present invention is directed to a trailer coupler assembly that attaches to the tongue of a trailer to provide a flexible and cushioned connection between a tow vehicle and the attached trailer. The trailer coupling assembly includes an attachment bracket that is adapted to be attached to a tongue of a trailer. In an embodiment, the attachment bracket is configured to align with existing apertures in the trailer tongue associated with a standard trailer coupler that was fixedly attached to the trailer tongue. The attachment bracket is pivotally connected to a trailer coupler having an attachment socket configured to receive a tow ball. The pivotal connection between these element permits a degree of independent relative movement between a trailer and a tow vehicle (i.e., when connected to the trailer). To dampen the movement between the attachment bracket and the trailer coupler, a resilient element such an air bag, air spring or other compressible member is disposed between the attachment bracket and the trailer coupler. The absorber dampens or attenuates movement between the vehicle and the trailer.

In effect, the trailer coupler assembly provides an at least partially pliable connection that at least partially isolates the trailer and the vehicle from each other. Instead of acting as a single unit, the vehicle and the trailer act at least partially independently of each other such that bouncing motion transferred from a trailer to a tow vehicle by many conventional hitches is reduced or eliminated, resulting in better control and a safer and more comfortable ride.

The absorber is, in an embodiment, an air spring or air bag. The air bag may be a sealed air bag having an internal bellows. In a further embodiment, the air bag may be a variable-pressure or adjustable-pressure air spring. For purposes of this specification, the term "absorber" refers to an elastic device that regains its original shape and/or position after being compressed or extended.

The absorber may be mounted in any fashion that allows for counteracting motion between the pivotally connected attachment bracket and trailer coupler. In one arrangement, the absorber is mounted between the first and second vertical structures (e.g., plates) attached to the attachment bracket and trailer coupler, which are pivotally connected. By locating the absorber between the first and second vertical structures, absorber is compressed or tensioned when the bracket and coupler pivot in response to the trailer and/or tow vehicle bouncing. The compression/tensioning of the absorber dampens relative movement between the vehicle and the trailer. In an arrangement, the absorber extends across the pivot axis connecting the attachment bracket and trailer coupler.

In an arrangement, the trailer coupling assembly is configured to replace an existing trailer coupler that is fixedly attached to a trailer tongue. In this arrangement, the trailer coupling assembly may have an attachment bracket with attachment apertures (e.g., bolt holes) that have a spacing that is substantially identical to the bolt holes of the existing trailer coupler. In such an arrangement, the existing trailer coupler may be removed (e.g., unbolted) from a trailer tongue and the trailer coupling assembly may be affixed (e.g., bolted) in it place. That is, the existing trailer coupler may be replaced with the trailer coupling assembly, which provides relative movement and dampening, without having to modify the trailer tongue. In such an arrangement, the trailer coupling assembly may be an after market part sold to upgrade existing trailers.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions. As used herein, the terms "horizontal," "vertical," "left," "right," "up," "down," "top," "bottom." as well as adjectival and adverbial derivatives thereof and similar terms, refer to the relative orientation of the illustrated structure as the particular drawing figure faces the reader. Such terms are provided for convenience of the reader and are to be broadly construed and not to provide any specific limitation.

Presented herein is a trailer coupler assembly that is configured for attachment to a tongue of a trailer. The trailer coupling assembly provides a connection between a trailer and a tow vehicle that allows for independent relative movement/motion between the trailer and the tow vehicle. Further, the trailer coupling assembly includes an absorber (e.g., air bag) that absorbs and dampens the relative movement. In an embodiment, the trailer coupler assembly is utilized to replace existing trailer couplers fixedly connected to a trailer such that the trailer may be modified to incorporate the independent movement and dampening provided by the presented trailer coupler assembly. However, it will be appreciated that the presented trailer coupler may be provided with original equipment manufacturer trailers and that no limitation should be inferred.

Figure 1A:
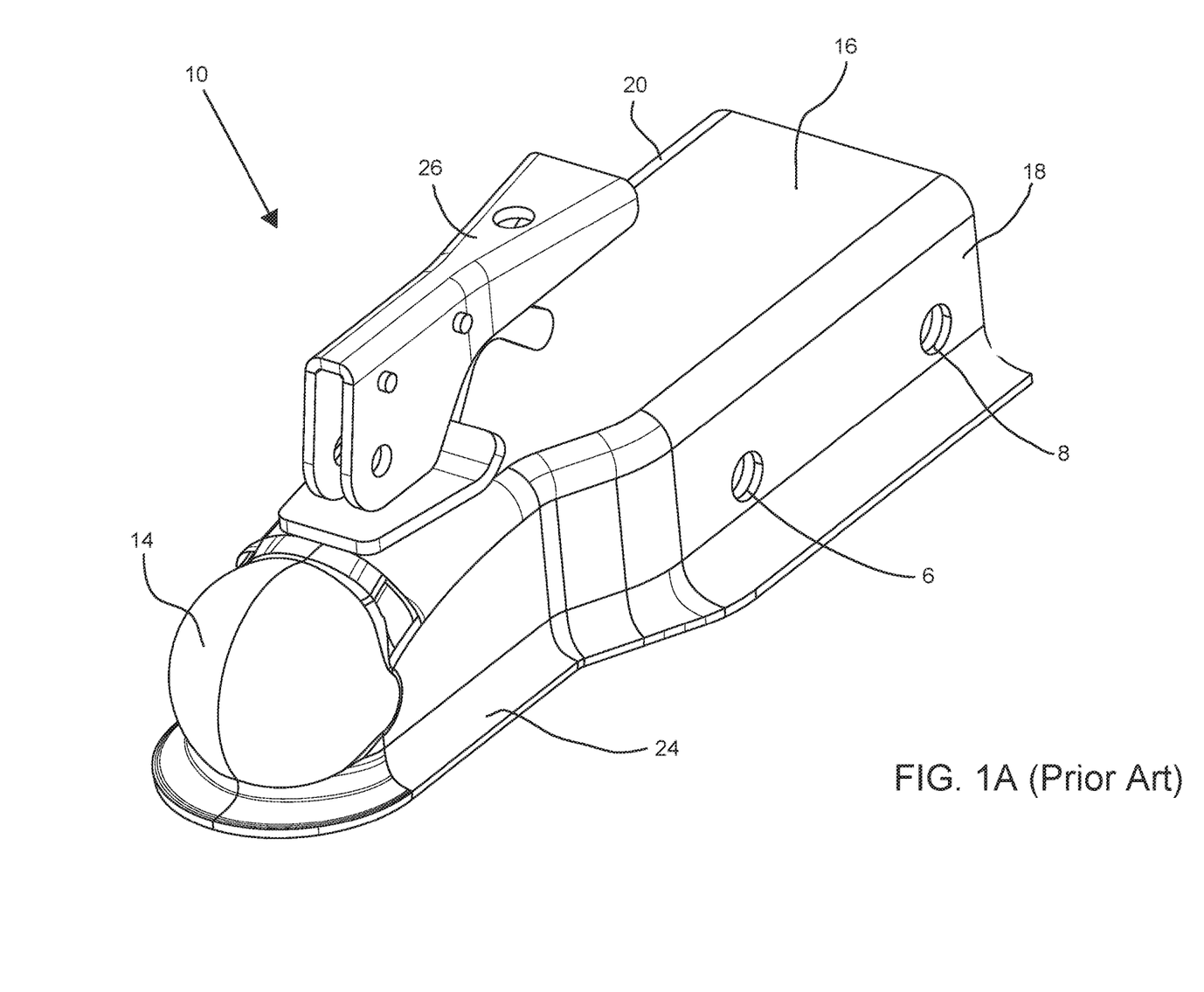
FIG. 1A is an isometric view of a prior art trailer coupler.
Figure 1B:
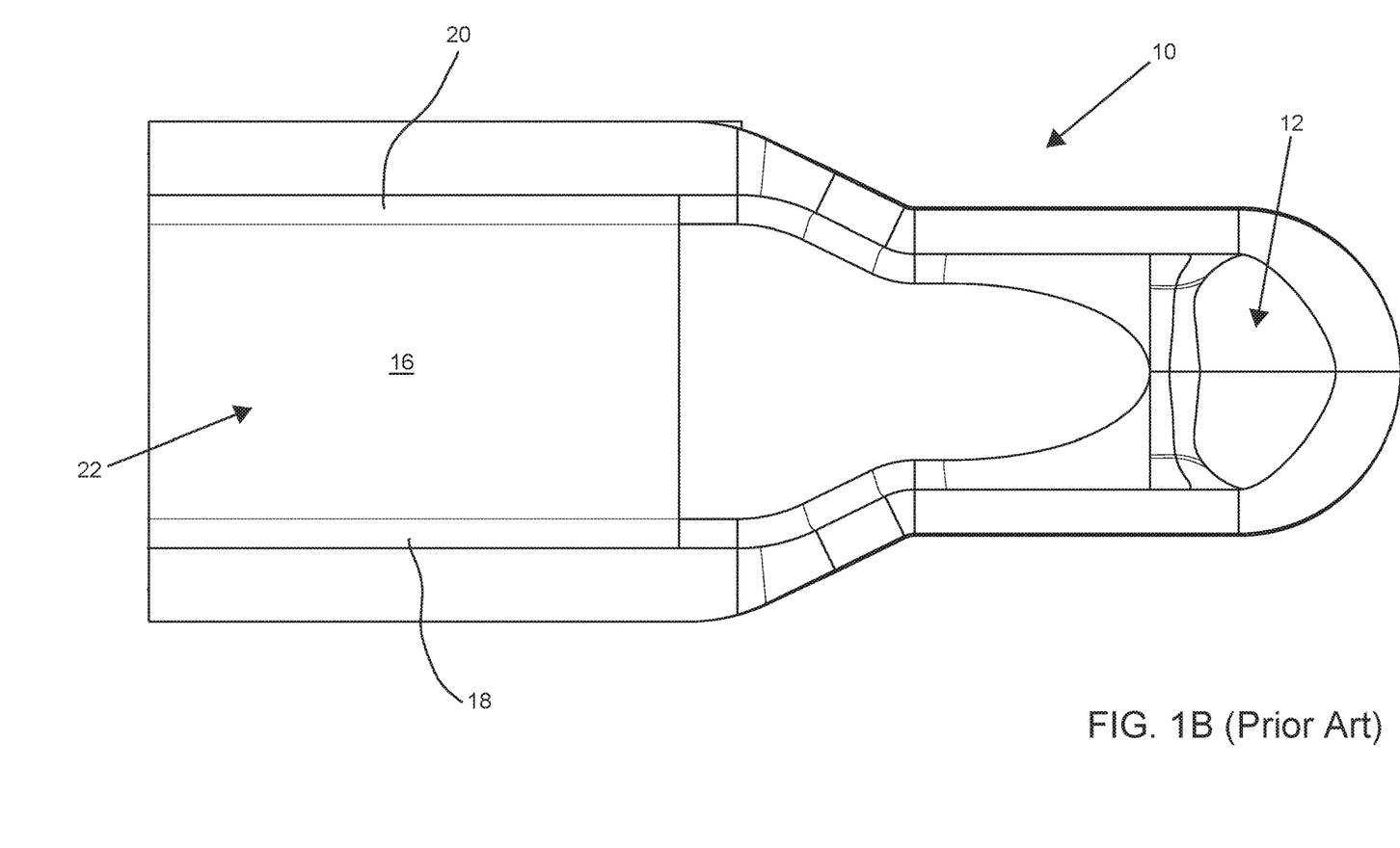
FIG. 1B is a bottom view of the trailer coupler of FIG. 1A.

FIGS. 1A and 1B illustrates an isometric view and a bottom view of an exemplary prior art trailer coupler 10. The illustrated embodiment of the prior art trailer coupler 10 is shown for a connection to a straight trailer tongue. However, it will be appreciated other trailer coupler configurations are possible. The prior art trailer coupler 10 and the trailer coupler assembly described herein may be constructed from any appropriate material, such as a material having resilient and durable properties, for example, metals, metal alloys, polymers and the like. In an embodiment, the trailer coupler 10 may be cast or made of a stamped steel, for example, into a singular component. However, the trailer coupler 10 is not limited to any specific material or any specific manner of forming the trailer coupler 10.

The trailer coupler 10 includes an attachment socket 14 that may be used to secure the trailer coupler 10 to a tow ball of a towing vehicle. In this regard, the attachment socket includes a bottom opening 12 that corresponds in size and shape to a tow ball that may be secured to the towing vehicle. The attachment socket may vary in size.

In the illustrated embodiment, a top plate 16 extends from the attachment socket 14. The top plate 16 may be shaped to correspond to the shape of a trailer tongue to which the coupler 10 attaches. For example, the top plate 16 may have a rectangular shape to correspond with a straight trailer tongue. The top plate 16 has a width defined between a first side plate 18 and a second side plate 20. The first side plate 18 and the second side plate 20 may extend downward, for example, from the top plate 16. In an embodiment, the first and second side plates 18, 20 may be substantially perpendicular to the top plate 16. The top plate 16 and side plates 18, 20 define a receiving channel 22 that is sized to fit over an end portion of a trailer tongue. Apertures 6 and 8 extend through the side plates for attaching (e.g., bolting) the trailer coupler to a tongue of a trailer.

The sides 18, 20 may extend from the top plate 16 to a structural lip 24 extending about a portion of the periphery of the trailer coupler 10. The structural lip 24 may extend along a portion of the sides 18, 20 and the attachment socket 14 to aid in strengthening the trailer coupler 10. A latching mechanism 26 is pivotally attached to the top plate 16. The latching mechanism 26 may be used to removably secure the trailer coupler 10 to a tow ball of a towing vehicle as known by those skilled in the art. For example, the latching mechanism 26 may have a latch tab (not shown) disposed in the bottom portion of the coupler 10 proximate to the opening 12 to lock and unlock a tow ball of a towing vehicle.

Figure 2A:
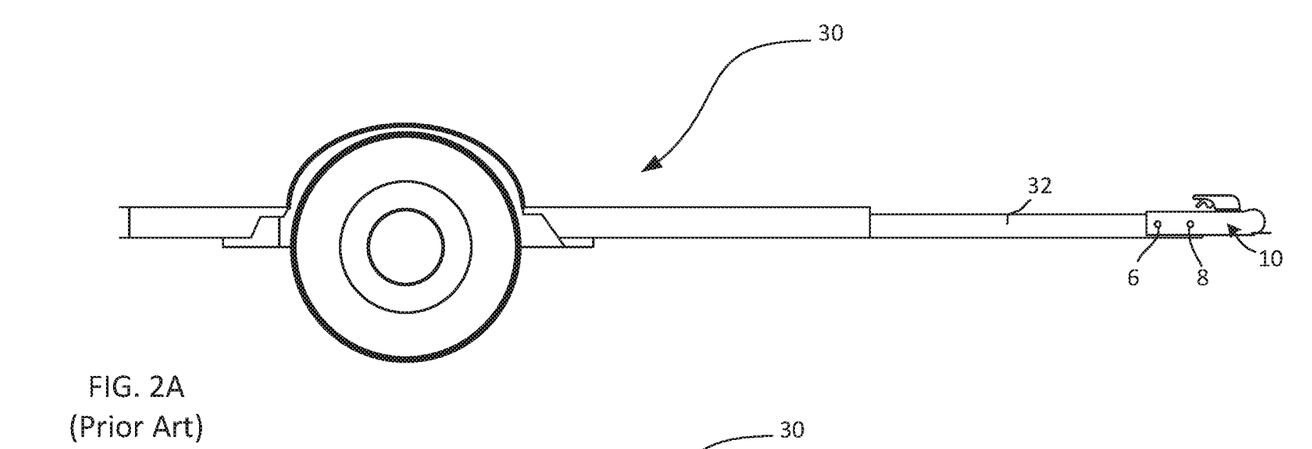
FIG. 2A illustrates the prior art trailer coupler attached to a trailer.

FIG. 2A illustrates the prior art coupler 10 attached to a trailer 30. In the illustrated embodiment, the trailer 30 is a small flatbed utility trailer. However, the illustrated embodiment of the trailer 30 is presented by way of example only. The presented trailer coupling assembly may be utilized with other trailers and no limitation should be inferred. As illustrated, the trailer coupler 10 is affixed to a tongue 32 (e.g., a square stock steel beam) of the trailer via first and second bolts (not shown) that extend through apertures 6, 8 formed in the side plates of the coupler 10. Once attached, the coupler 10 is rigidly attached to the tongue 32 of the trailer 30. Accordingly, any bouncing or vibration of the trailer 30 is transmitted to a tow vehicle (not shown) via the fixedly attached coupler 10. Likewise, such movement of the tow vehicle may be transmitted to the trailer 30 via the fixed coupler 10.

Figure 2B:
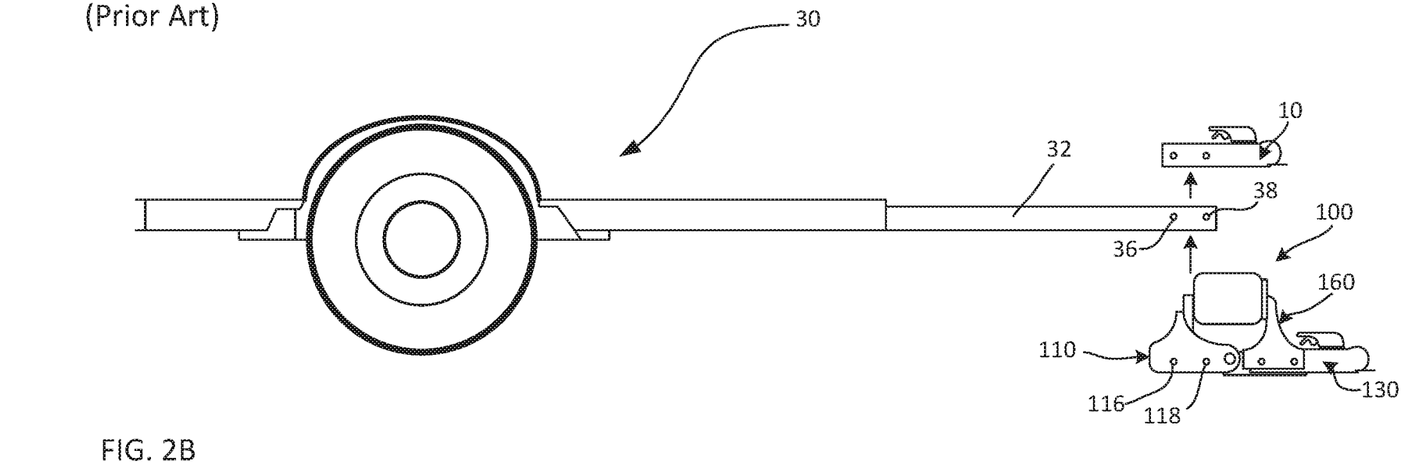
FIG. 2B illustrates removal of the prior art trailer coupler from a trailer.
Figure 2C:
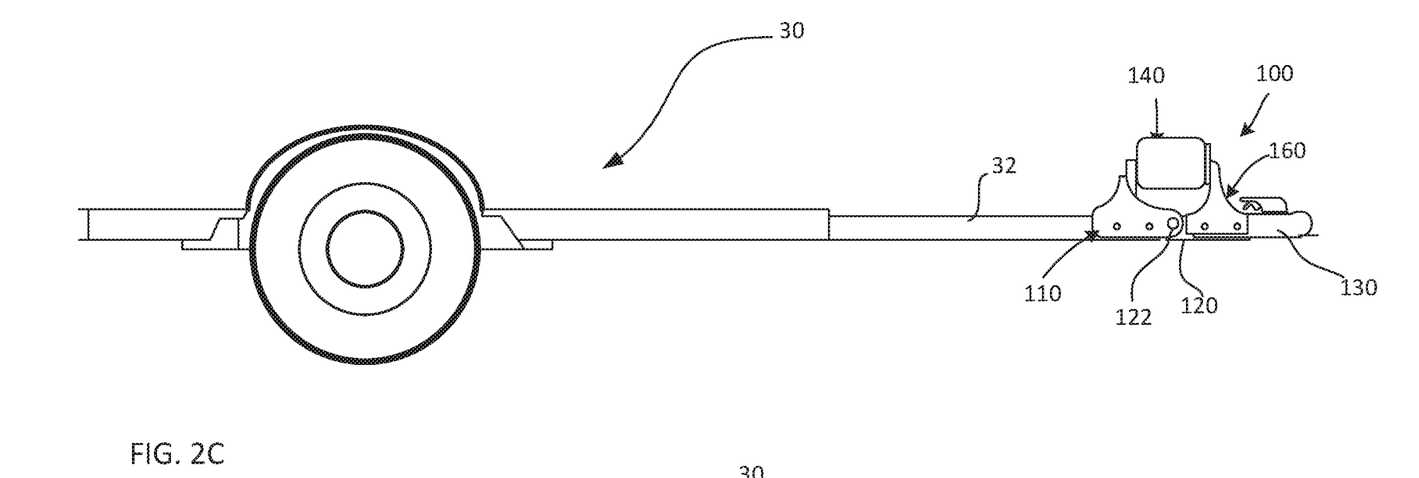
FIG. 2C illustrates replacement of the prior art trailer coupler with the presented trailer coupler assembly.

To provide a movable connection to limit the transmission of relative movement between a trailer and a tow vehicle, aspects of the present disclosure are directed to replacing the prior art coupler 10 with a pivoting trailer coupler assembly 100, which permits some independent movement between the trailer and the tow vehicle and also which also attenuates or dampens such movement. As illustrated in FIG. 2B, in one embodiment, the trailer coupler assembly 100 may replace a prior art trailer coupler 10. In such an arrangement, bolts extending through the apertures 6, 8 of the prior art trailer coupler 10 may be removed such that the trailer coupler 10 may be removed from the tongue 32 of the trailer 30. Removal of the prior art coupler 10 exposes existing apertures 36, 38 in the tongue 32 of the trailer. In an embodiment, a trailer attachment bracket 110 of the trailer coupler assembly 100 includes apertures 116, 118 that are sized to match the existing apertures 36, 38 in the trailer tongue. Accordingly, the trailer coupler assembly 100 may be readily bolted to the tongue 32 of the trailer 30 as shown in FIG. 2C.

Figure 2D:
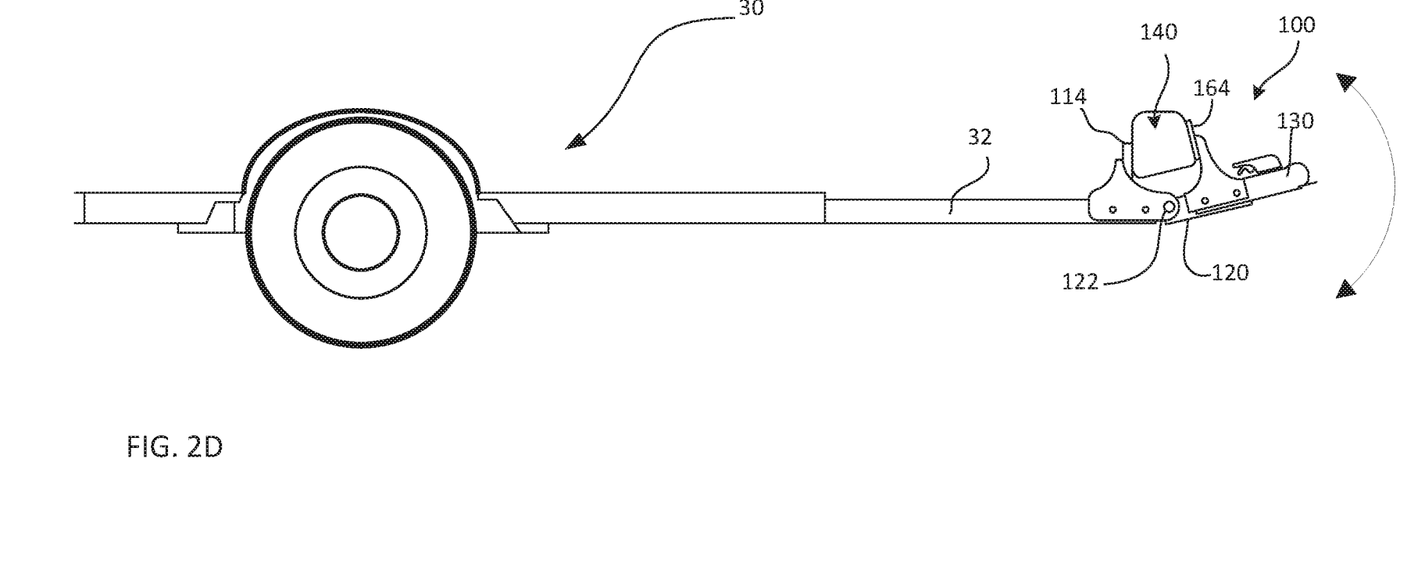
FIG. 2D illustrates the pivotal movement provided by the presented trailer coupler assembly.

As is more fully discussed herein, the trailer attachment bracket 110 is pivotally connected to a trailer coupler 130, which may be substantially similar and/or identical to the prior art trailer coupler 10 described above. More specifically, the trailer attachment bracket is pivotally connected to a carrier bar 120 via an axle or pin 122 (e.g., defining a pivot axis) that extends substantially perpendicular to a long axis of the trailer tongue in a horizontal plane. The carrier bar 120 supports the trailer coupler 130. For instance, a channel in the bottom of the trailer coupler 130 may receive the carrier bar 120 and be bolted thereto. In an embodiment, the carrier bar 120 may have the same cross-dimensions (e.g., width and depth) as the tongue 32. However, this is not a requirement. Once the bracket 110 is affixed to the trailer tongue 32, the carrier bar 120 and trailer coupler 130 are able to pivot about to the pin 122 as shown in FIG. 2D. This pivotal movement at least partially isolates movement of the trailer (e.g., bouncing, vibration, etc.) relative to a tow vehicle and vice versa. To further attenuate such relative movement a compressible absorber 140 is disposed between a forward bracket 160 connected to the trailer coupler 130 and the attachment bracket 120.

Figure 3A:
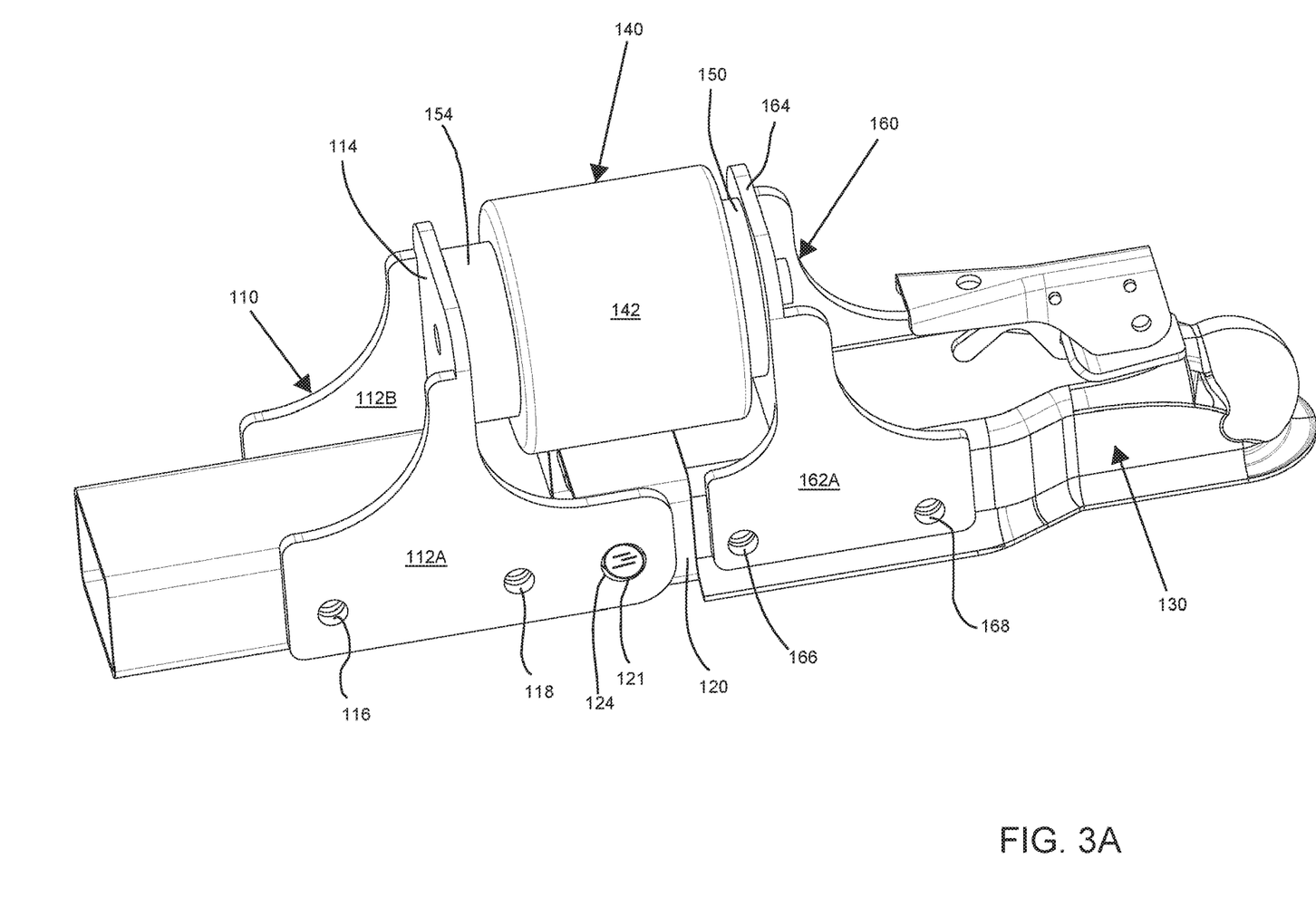
FIG. 3A illustrates a first isometric view of the presented trailer coupler assembly.
Figure 3B:
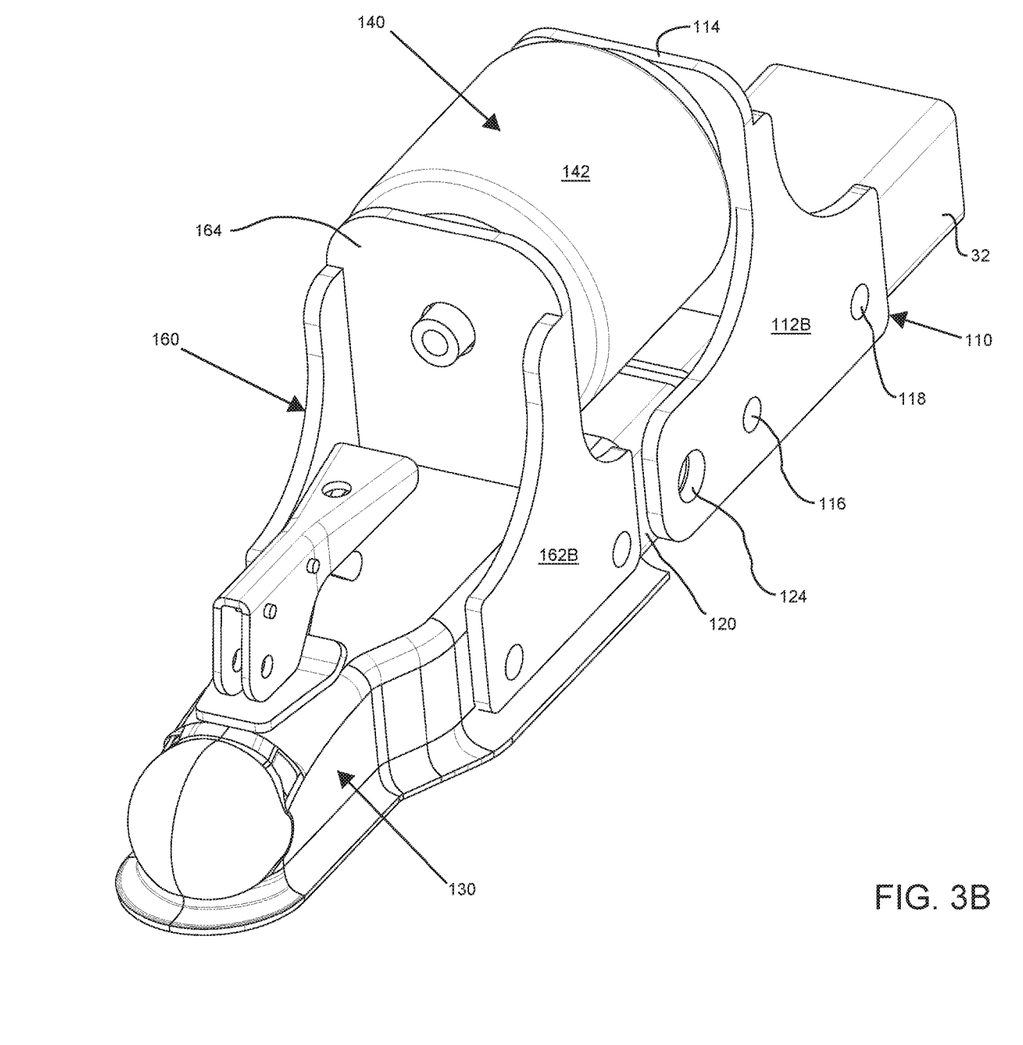
FIG. 3B illustrates a second isometric view of the presented trailer coupler assembly.
Figure 3C:
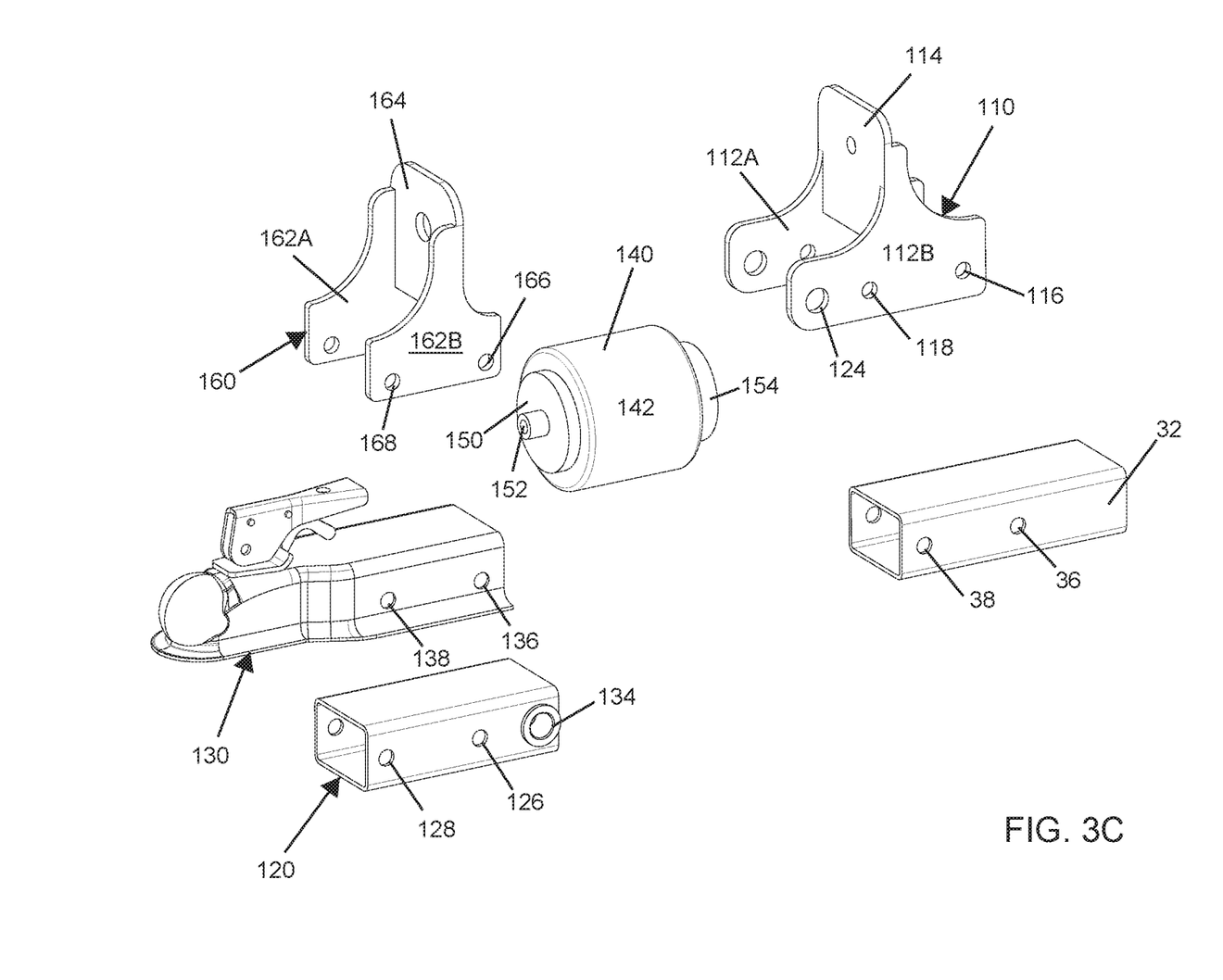
FIG. 3C illustrates an exploded isometric view of the presented trailer coupler assembly.
2.

The trailer coupler assembly is further illustrated in FIGS. 3A-3C. The trailer coupler assembly 100 includes four primary components, the trailer coupler 130, the trailer attachment bracket 110, the absorber 140 and the forward bracket 160. As shown, the attachment bracket 110 is formed of first and second side plates 112A, 112B, which are spaced to receive opposing side surfaces of the trailer tongue 32 therebetween. The lower edge of each plate 112A and 112B (hereafter plate 112 and less specifically referenced) is configured to extend along a length of the tongue and includes first and second apertures 116, 118, which align with apertures in the trailer tongue 32. These apertures are utilized to bolt the spaced plates 112 to the trailer tongue. The brackets 112 each extend vertically above a top surface of the trailer tongue when the trailer tongue is disposed therebetween. A backing or rear plate 114 e.g., absorber connection plate) extends between the vertical portions of bracket plates 112 (e.g., portions extending above a top surface of the trailer tongue when disposed therebetween) and is fixedly connected to the plates (e.g., welded). In the present embodiment, the rear plate 114 is substantially perpendicular to a top surface of the trailer tongue 32 as well as substantially perpendicular to a long axis of the trailer tongue. The rear plate is utilized to mount a rearward end of the absorber 140 to the trailer coupler assembly. Though described as a 'plate', it will be appreciated that the rear plate 114 may be formed of any structure that extends vertically above the trailer tongue and which is fixedly connected to the attachment bracket. What is important is that the vertical structure (e.g., rear plate) provide a structure to which the absorber may be mounted. A forward end of the lower portions of each bracket plate 112 further include a pin aperture 124 that is sized to receive the axel or pin 121 (See FIG. 3A) that pivotally couples the attachment bracket to the carrier bar 120.

The forward bracket 160 is formed of first and second side plates 162A, 162B, which are spaced to receive opposing side surfaces of the trailer coupler 130 therebetween. The lower edge of each plate 162A and 162B (hereafter plate 162 and less specifically referenced) is configured to extend along a length of the trailer coupler 130 and includes first and second apertures 166, 168, which align with apertures 136, 138 in the trailer coupler. These apertures are utilized to bolt the spaced plates 162 to the trailer coupler 130 and the carrier bar 120. The plates 162 each extend vertically above a top surface of the trailer coupler. A front plate 164 (e.g., absorber connection plate) extends between the vertical portions of bracket plates 162 (e.g., portions extending above a top surface of the trailer coupler) and is fixedly connected to the plates (e.g., welded). In the present embodiment, the front plate 164 is substantially perpendicular to a top surface of the trailer coupler 130. The front plate 164 is utilized to mount a forward end of the absorber 140 to the trailer coupler assembly 100. Though described as a 'plate', it will be appreciated that the front plate 164 may be formed of any structure (e.g., vertical structure) that extends vertically above the trailer coupler and which is fixedly connected to the trailer coupler. What is important is that the vertical support structure (e.g., front plate) provide a structure to which the absorber may be mounted.

As previously noted, the carrier bar 120 is received in a bottom channel of the trailer coupler 130. As best shown in FIG. 3C, the carrier bar 120 includes first and second apertures 126, 128 that are sized to align with apertures 136, 138 in the trailer coupler 130 as well the apertures 166, 168 in the forward bracket 160. Accordingly, bolts (not shown) may extend through the corresponding apertures to attach the coupler 130 and forward bracket 160 to the carrier bar 120. The carrier bar 120 is sized such that a rearward portion extends beyond a rearward end of the coupler 130. The rearward portion of the carrier bar 120 further includes a pin aperture 134 that is sized to receive the axel or pin (not shown in FIGS. 3A-3C) that pivotally couples the attachment bracket 110 to the carrier bar 120. The rearward portion of the carrier bar 120 is sized for receipt between the lower forward edges of the plates 112 of the trailer attachment bracket 110. When positioned between the plates 112 of the attachment bracket 110, the pin aperture 134 of the carrier bar 120 is aligned with the pin apertures 124 in the bracket plates 112. At this time an axel pin may pass through the aligned apertures pivotally connecting the carrier bar 120 and trailer coupler 130 to the attachment bracket 110 and/or to the trailer tongue 30.

As best shown in FIG. 2D, the front plate 164 moves toward and away (e.g., pivots) from the rear plate 114 in conjunction with the pivoting of the carrier bar 120 and trailer coupler 130 relative to the trailer tongue. When the front plate 164 pivots toward the rearward plate 114 (as shown in FIG. 2D), the absorber 140 is compressed between the plates. When the front plate 164 pivots away from the rearward plate 114 (not shown) the absorber 140 is tensioned between the plates. The compressing and tensioning of the absorber dampens the relative movement between the trailer 30 and the tow vehicle.

In the illustrated embodiment, the absorber 140 is a sealed air bag 142 similar to air bags utilized for air ride suspensions. However, it will be appreciated that the absorber may be formed of any resilient element that returns to its original shape after being stretched, compressed or otherwise or deformed. That is, any appropriate dampening means may be utilized. When utilizing an air bag, the air bag is typically made from heavy-duty reinforced rubber (e.g., vulcanized rubber) or other polymeric material, which, in the present embodiment, includes a single internal sealed chamber filled with a compressible gas (e.g., air, nitrogen etc.) Stated otherwise, the presented absorber is a single bellows air bag. However, it will be appreciated that other embodiments may utilize an air bag having multiple bellows. Further, while the present embodiment utilizes a sealed air bag, other embodiments may permit for the adjustment of the internal pressure of the air bag(s). In such an embodiment, the air bag absorber 140 may be a pneumatic device that can be manually inflated or deflated to a desired internal pressure. In such an embodiment, such an air bag may include an air valve (e.g., a Schrader valve).

The air bag 142 includes first mounting lug 152 attached to a first end plate 150 disposed on a first end of the air bag 142 and a second mounting lug (not shown) attached to a second mounting plate 154 disposed on a second end of the air bag 142. The mounting lugs are dimensioned to fit through apertures in the front plate 164 and the rear plate 114. In this regard, the mounting lugs are inserted into the apertures and secured thereto by suitable sized nuts. The interconnection of the mounting lugs to the plates secures the absorber 140 between the plates 114, 164.

The use of the air bag 142 as the absorber provides a simplified element the works well in both compression and tension. However, it will be appreciated that in further embodiments, alternative absorbers may be utilized. Such absorbers include mechanical and/or hydraulic devices. Of further note, placement of the absorber While driving a vehicle that is connected to a trailer including the trailer coupler assembly 100, less movement of the trailer is transmitted to the vehicle due to the independent movement of the trailer coupler and the dampening action provided by the absorber. Instead of acting as a single unit, the vehicle and the trailer act more independently of one another, resulting in better control by the driver and a safer, more comfortable ride. As the pivot axis between the attachment bracket and the trailer coupler is disposed in a horizontal plane and perpendicular to the long axis of the trailer tongue, the assembly readily absorbs bouncing motion of the trailer or tow vehicle reducing the transmission of such motion. Further, in the illustrated embodiment, the absorber is positioned directly above and across the interface of the attachment bracket and the trailer coupler. This near co-location with the pivotal connection allows for improved dampening this movement.

It will be understood by those of ordinary skill in the art that the materials, dimensions, weight, and selection of components for above-described trailer coupler assemblies depend on the particular application and anticipated load-bearing capacity of the hitches. All components are preferably made of sturdy, durable materials, including but not limited to stainless steel, steel, aluminum, iron, rubbers and polymers. Metal components of hitches may be machined of standard stock and welded or otherwise fastened together; alternatively, some or all of these components may be cast, poured or injected by suitable techniques known in the art of metal-working.

The foregoing description of the trailer coupler assembly has been presented for purposes of illustration and description. Furthermore, the description is not intended to limit the invention to the form disclosed herein. Consequently, variations and modifications commensurate with the above teachings, and skill and knowledge of the relevant art, are within the scope of the presented invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A trailer coupler assembly for attachment to a tongue of a trailer, comprising:
   an attachment bracket configured for fixed connection to a trailer tongue;
   a first vertical structure fixedly attached to the attachment bracket and extending above a top surface of the trailer tongue when said attachment bracket is attached to the trailer tongue;
   a trailer coupler pivotally connected to said attachment bracket and having an attachment socket configured to receive a tow ball;
   a second vertical structure fixedly attached to said trailer coupler and extending above a top surface of said trailer coupler;
   an absorber having a first end connected to said first vertical structure and a second end connected to said second vertical structure, wherein pivotal movement of said trailer coupler relative to said attachment bracket causes one of:
      compression of said absorber between said first and second vertical structures; and
      tensioning said absorber between said first and second vertical structures.

2. The assembly of claim 1, wherein a pivot axis connecting said attachment bracket and said trailer coupler is perpendicular to a long axis of the trailer tongue.

3. The assembly of claim 1, wherein said absorber extends across a pivotal connection between said attachment bracket and said trailer coupler.

4. The assembly of claim 1, wherein said absorber comprises:
   a resilient element configured to return to an original shape after being one of compressed or tensioned.

5. The assembly of claim 4, wherein said resilient element comprises:
   a sealed air bag.

6. The assembly of claim 1, wherein said attachment bracket comprises:
   first and second plates, wherein said first and second plates are spaced to receive a portion of the trailer tongue therebetween, wherein planar surfaces of the first and second plates are substantially parallel to a long axis of the trailer tongue.

7. The assembly of claim 6, wherein each of said first and second plates further comprises:
   at least first and second apertures extending through a lower portion of said plate, wherein said first and second apertures are configured to align with apertures in the trailer tongue.

8. The assembly of claim 7, wherein said first vertical structure fixedly attached to said attachment bracket comprises:
   an absorber connection plate extending between and fixedly connected to said first and second plates, wherein a planar surface of said absorber connection plate is substantially perpendicular to said planar surfaces of said first and second plates.

9. The assembly of claim 1, further comprising:
   a carrier bar disposed in channel in the bottom of said trailer coupler, wherein the carrier bar is fixedly connected to said trailer coupler and extends beyond a rearward end of said trailer coupler opposite of the attachment socket.

10. The assembly of claim 9, wherein a portion of said carrier bar that extends beyond said rearward end of said trailer coupler is pivotally connected to said attachment bracket.

11. The assembly of claim 9, further comprising:
   first and second plates connected to said trailer coupler and said carrier bar and extending along a length of said trailer coupler and above a top surface of said trailer coupler.

12. The assembly of claim 11, wherein said second vertical structure is fixedly attached to said trailer coupler:
   an absorber connection plate extending between and fixedly connected to said first and second plates.

\* \* \* \* \*